UNITED STATES PATENT OFFICE.

PAUL THOMASCHEWSKI AND HEINRICH RAEDER, OF VOHWINKEL, AND WALTER MIEG AND PAUL FISCHER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN VAT DYE.

971,225.  Specification of Letters Patent.  Patented Sept. 27, 1910.

No Drawing. Original application filed February 12, 1910, Serial No. 543,493. Divided and this application filed April 21, 1910. Serial No. 556,655.

REISSUED

*To all whom it may concern:*

Be it known that we, PAUL THOMASCHEWSKI and HEINRICH RAEDER, residing at Vohwinkel, and WALTER MIEG and PAUL FISCHER, residing at Elberfeld, Germany, citizens of the German Empire, have invented new and useful Improvements in Brown Vat Dyes, of which the following is a specification.

Our present invention relates to the manufacture and production of a new vat dye of the anthracene series. The process for its preparation consists in condensing 1-amino-4-benzoylaminoanthraquinone with 1-benzoylamino-5-chloroanthraquinone and treating the resulting compound with concentrated sulfuric acid.

The new product is after being dried and pulverized a brown-black powder soluble in cold concentrated sulfuric acid with a brown color. It yields on treatment with hydrosulfite and caustic soda lye a vat suitable for dyeing cotton fast brown shades.

In carrying out the new process practically we can proceed as follows, the parts being by weight: A mixture of 10 parts of 1-monobenzoyl-4-aminoanthraquinone (obtained by reducing 1-benzoylamino-4-nitroanthraquinone), 10.6 parts of 1-benzoylamino-5-chloroanthraquinone, 0.1 part of $CuCO_3$, 5 parts of anhydrous sodium acetate and 100 parts of nitrobenzene is heated to boiling for about 3 hours. The resulting product is precipitated from the melt with toluene. After cooling the dye is filtered off, washed with water and alcohol and dissolved in 10 parts of concentrated sulfuric acid. The solution thus obtained is heated to from 60-80° C. and poured into water. The precipitate is filtered off and dried.

We claim:—

The herein described new vat dyestuff of the anthracene series which can be obtained by first condensing 1-amino-4-benzoylaminoanthraquinone with 1-benzoylamino-5-chloroanthraquinone and then treating the resulting product with concentrated sulfuric acid, which dyestuff is, after being dried and pulverized, a brown-black powder, which is soluble in cold concentrated sulfuric acid with a brown color; yielding a vat with hydrosulfite and caustic soda lye, which vat dyes cotton brown shades, substantially as described.

In testimony whereof we have hereunto set our hands in the presence of two subscribing witnesses.

PAUL THOMASCHEWSKI. [L. S.]
HEINRICH RAEDER. [L. S.]
WALTER MIEG. [L. S.]
PAUL FISCHER. [L. S.]

Witnesses:
OTTO KÖNIG,
WALTER VONNEGUT.